United States Patent
Ludwig et al.

(10) Patent No.: US 12,101,523 B2
(45) Date of Patent: Sep. 24, 2024

(54) METHOD AND SYSTEM FOR VEHICLE DATA FILE PLAYBACK

(71) Applicant: BlackBerry Limited, Waterloo (CA)

(72) Inventors: Sue Hsiu Ying Ludwig, Mississauga (CA); Houffaneh Ali Osman, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/480,801

(22) Filed: Sep. 21, 2021

(65) Prior Publication Data
US 2023/0090918 A1    Mar. 23, 2023

(51) Int. Cl.
*H04N 21/414* (2011.01)
*H04N 21/2387* (2011.01)
*H04N 21/426* (2011.01)

(52) U.S. Cl.
CPC ... *H04N 21/41422* (2013.01); *H04N 21/2387* (2013.01); *H04N 21/4263* (2013.01)

(58) Field of Classification Search
CPC ......... H04N 21/41422; H04N 21/2387; H04N 21/4263
See application file for complete search history.

(56) References Cited

U.S. PATENT DOCUMENTS

| 10,127,022 | B2 | 11/2018 | Sharma et al. |
| 2017/0237983 | A1* | 8/2017 | Adsumilli ...... H04N 21/234345 375/240.03 |
| 2018/0120112 | A1* | 5/2018 | Yost ........................ G01C 21/18 |
| 2018/0288007 | A1 | 10/2018 | Poornachandran et al. |
| 2020/0379449 | A1* | 12/2020 | Hu ........................... H04L 67/12 |
| 2021/0302941 | A1* | 9/2021 | Francis .............. G05B 19/4188 |

OTHER PUBLICATIONS

Patent Cooperation Treaty (PCT) International Search Report and Written Opinion of the International Searching Authority for International Application No. PCT/US2022/043491 dated Dec. 23, 2022, 12 pages.

* cited by examiner

*Primary Examiner* — Yassin Alata
(74) *Attorney, Agent, or Firm* — Moffat & Co

(57) ABSTRACT

A method at a computing device, the method including receiving, at the computing device, sensor data from a data source; converting, at a playback tool on the computing device, the sensor data into converted data, thereby bypassing abstraction layers at the computing device; and providing the converted data to at least one synthetic sensor on the computing device, wherein each of the at least one synthetic sensor provides an insight regarding operation of the computing device.

18 Claims, 6 Drawing Sheets

METHOD AND SYSTEM FOR VEHICLE DATA FILE PLAYBACK

FIELD OF THE DISCLOSURE

The present disclosure relates to distributed systems, and in particular relates to data file playback of a distributed system.

BACKGROUND

Modern vehicles have many sensors. However, such sensors may be distributed within the various computing nodes on the vehicle, where each computing node may have access to zero, one or more sensor drivers. Such sensor nodes may further have different manufacturers and operate using different operating systems. Similarly, other distributed systems could have a plurality of nodes where the nodes need to communicate with each other.

Sensors, or groups of sensors, may be used to generate information that could be useful to one or more applications. Such information is referred to herein as an insight.

However, for prototyping and safety reasons, development may need to occur off a real vehicle.

BRIEF DESCRIPTION OF THE DRAWINGS

The present disclosure will be better understood with reference to the drawings, in which.

DETAILED DESCRIPTION OF THE DRAWINGS

Figure 1:
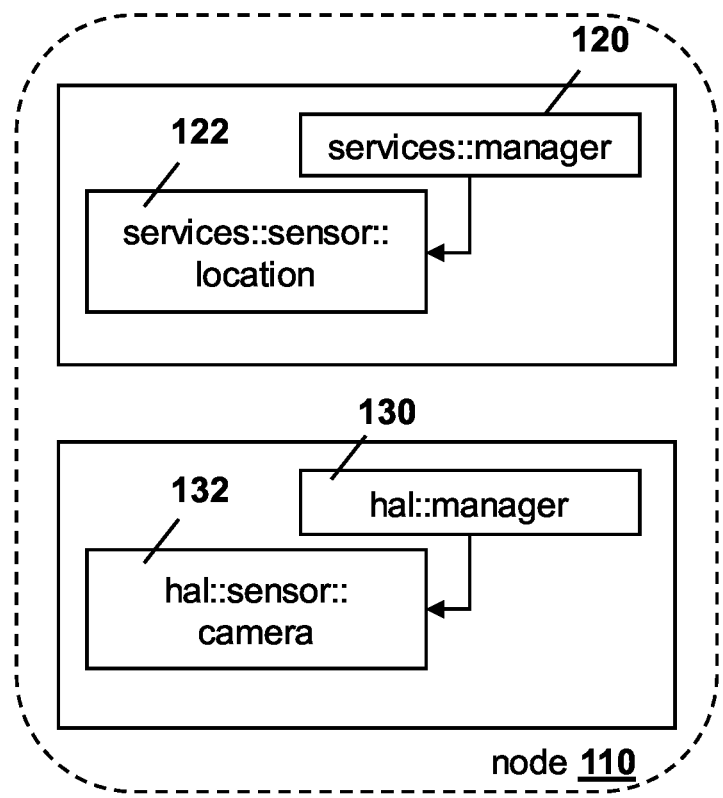
FIG. 1 is a block diagram showing an example computing node within a computer system.

The present disclosure provides a method at a computing device comprising: receiving, at the computing device, sensor data from a data source; converting, at a playback tool on the computing device, the sensor data into converted data, thereby bypassing abstraction layers at the computing device; and providing the converted data to at least one synthetic sensor on the computing device, wherein each of the at least one synthetic sensor provides an insight regarding operation of the computing device.

The present disclosure further provides a computing device comprising: a processor; and a communications subsystem, wherein the computing device is configured to: receive sensor data from a data source; convert, at a playback tool on the computing device, the sensor data into converted data, thereby bypassing abstraction layers at the computing device; and provide the converted data to at least one synthetic sensor on the computing device, wherein each of the at least one synthetic sensor provides an insight regarding operation of the computing device.

The present disclosure further provides a computer readable medium for storing instruction code which, when executed by a processor of a computing device cause the computing device to receive sensor data from a data source; convert, at a playback tool on the computing device, the sensor data into converted data, thereby bypassing abstraction layers at the computing device; and provide the converted data to at least one synthetic sensor on the computing device, wherein each of the at least one synthetic sensor provides an insight regarding operation of the computing device.

In a modern vehicle, information from one or more physical sensors may be processed to create an "Insight" that may be valuable in a system. Such one or more physical sensors and the processing associated therewith may be referred to logically as a micro-service or a Synthetic Sensor (SS). The terms micro-service and Synthetic Sensor are used interchangeably herein.

Synthetic Sensors may exist in other types of applications, including but not limited to medical applications, manufacturing applications, Internet of Things applications, among others, and the present disclosure is not limited to vehicle applications. Vehicle applications are provided for illustration below.

Insight is the term used herein to describe any computer created interpretation of basic sensor data. Insights can be as straight forward as data aggregation or correlation or as complex as artificial intelligence and machine learning. For example, a temperature sensor providing high and low watermarks for notification may be considered an "insight". For location services, geofencing is an insight. For cameras, occupant recognition may be an insight. The use of a combination of sensors such as temperature sensors and cameras, may be used with an artificial intelligence model to determine whether a car seat is occupied in a hot vehicle, which may be an insight. Many other examples of insights are possible.

In one embodiment, the vehicle applications may be implemented in a system providing consistent access to vehicle data and intelligent insights in a way that is familiar and accessible to developer communities. Such environment may allow cloud developers to extend their reach to the edge within the vehicle through the development of Synthetic Sensors which derive intelligent insights on vehicle data using common cloud development technologies and paradigms. Such environment may provide consistent access to vehicle data such that Synthetic Sensors can be written and deployed to a broad vehicle base without bespoke customization.

Insights may be generated based on a processor running on a first installation or domain, but they often need to be shared with authorized software modules running in external domains. The first domain is able to control the installation and communication of modules within it, and therefore determine their identity and authorization. However, the first domain does not have such control in other domains.

For example, one external domain may be an In-Vehicle Infotainment (IVI) system of an automobile that may run an application that accesses insights and provides information to a driver.

However, prior to deploying such systems in the real world, it may be desirable to playback data files within the system, for example as a simulation. This can be for a variety of factors, including safety reasons, quick prototyping, or demonstration of the system to potential customers, developers, partners, or others.

For example, to deploy a new synthetic sensor into a real-world environment would require the development of abstraction layers to integrate sensors into the system, require the data be obtained from the system to ensure that the system is working correctly, and may potentially cause errors, or unsafe conditions, in the vehicle.

Further, in order to demonstrate the functionality of the synthetic sensor or plurality of synthetic sensors to an audience, this becomes difficult in a real vehicle.

Example Vehicle System

The present disclosure will be described with regard to an automotive system with nodes. However, this is merely provided for illustration purposes and the methods and systems described herein could equally be used with any other systems.

For example, reference is now made to FIG. 1 which shows a node 110. A node, as used herein, may be one or a group of electronic control units, central processing units, or kernel controls, among other options, and can be considered as a single computing unit.

In the example of FIG. 1, node 110 includes a services manager 120 which may interact with drivers for sensors that the node is connected to. For example, the node 110 may have access to a location sensor such as a Global Positioning System (GPS) chipset, as shown at block 122.

In order to allow node 110 to interact with modules on other nodes, and to provide functionality with a computing system, a Hardware Abstraction Layer (HAL) may be provided on node 110, which comprises a HAL service 130. Each HAL service 130 is responsible for the integration of a sensor and may provide various functions, including: integration to the underlying sensor; normalization of the sensor data; and/or, if required, providing a barrier between the safety certified and non-certified software. Other functions for the HAL service are also possible.

In the example of FIG. 1, the HAL is provided for camera information, as shown with block 132.

While the example of FIG. 1 shows a node 110 with a single service and a single HAL, this is merely provided for illustration purposes. A node 110 could have a single service without a HAL, a single HAL without a service, a plurality of services with no HAL, a plurality of HALs with no service, and/or a combination of services and HALs.

One example of a system that could use node 110 would be an applications development environment for vehicles. Such applications development environment may develop applications for user experience including comfort, navigation, infotainment, among others, applications for safety, applications for fleet management; applications for performance monitoring; or other such applications for a vehicle environment. In particular, vehicles provide a plurality of sensors and different makes, models or brands may use different sensors with different data formats or values, creating fragmented sensor readings depending on such sensor. This fragmentation impedes the fostering of an application ecosystem that makes use of vehicle data. In addition, low level sensor data is often too granular to be readily useful to applications.

In this regard, the Hardware Abstraction Layer can be used to provide hardware independent sensor interfaces/abstractions which may encapsulate interaction with underlying sensor drivers. The use of the hardware abstraction in the various computing nodes creates a platform that is extensible, can provide barriers between modules to, for example, enforce safety certified systems being separate from other systems, among other options.

Applications do not interact directly with sensor hardware to access sensor data, instead they leverage the Hardware Abstraction Layer. This separation provides a clear distinction between the responsibilities of the HAL (sensor integration and normalizing sensor data) and other abstractions such as a Vehicle Abstraction Layer (VAL), used for managing access to vehicle data and providing value-added insights.

Specifically, insights may leverage sensor data from multiple HALs in order to provide vehicle abstraction and value-added insights. Vehicle insight services in the VAL may control access to a normalized form of vehicle data and provide value-added inferences. Examples of insight services may include a Location Service, which may provide coordinate location data in a consistent format as well as insights such as geo-fencing; a Seat Service, which may provide a myriad of seat information such as belt status, weight, position, and child lock status; a Camera Service which may provide the video stream for in-cabin camera and possibly functions such as conversions and/or clipping; a Battery Service which may provide insights and access to battery such as charge state/consumption/projected hours remaining/projected range; a Door Service which may provide an abstraction for vehicle doors and door status; among others.

Insight Services may leverage sensor data from multiple HALs in order to provide vehicle abstraction and value-add insights. Higher level insights on data enable application developers to create future automotive experiences. Insight is the term used to describe any value-added interpretation of basic sensor data. Insights can be as straight forward as data aggregation or correlation or as complex as artificial intelligence and machine learning. For example, for a temperature sensor, providing high and low watermarks for notification may be considered an "insight". For location services—geofencing is an insight, for cameras—occupant recognition may be considered an insight.

Nodes with services and HAL managers as described in FIG. 1 are therefore needed for such application development environment. Node 110 will, in many systems, need to communicate with other nodes, such as other ECUs, CPUs, or computing systems, where such ECUs, CPUs, or computing systems may use a different operating system from that of node 110.

However, when developing synthetic sensors, testing such synthetic sensors, or demonstrating such synthetic sensors, the overhead of creating an abstraction layer between real world sensor data and the synthetic sensors can be a burden and cause development to stall. In this regard, a playback mechanism may be used to bypass hardware and vehicle abstraction layers, where such playback mechanism can be used for prototyping or demonstration of synthetic sensors.

Demonstration and Prototyping Tool

In accordance with the embodiments of the present disclosure, playback of data for vehicle operations, and in particular playback of data for synthetic sensors within a vehicle, can be accomplished utilizing a data source providing information to various abstraction layers playback tools within an edge node. This is, for example, described with regard to FIGS. 2, 3 and 4.

Figure 2:
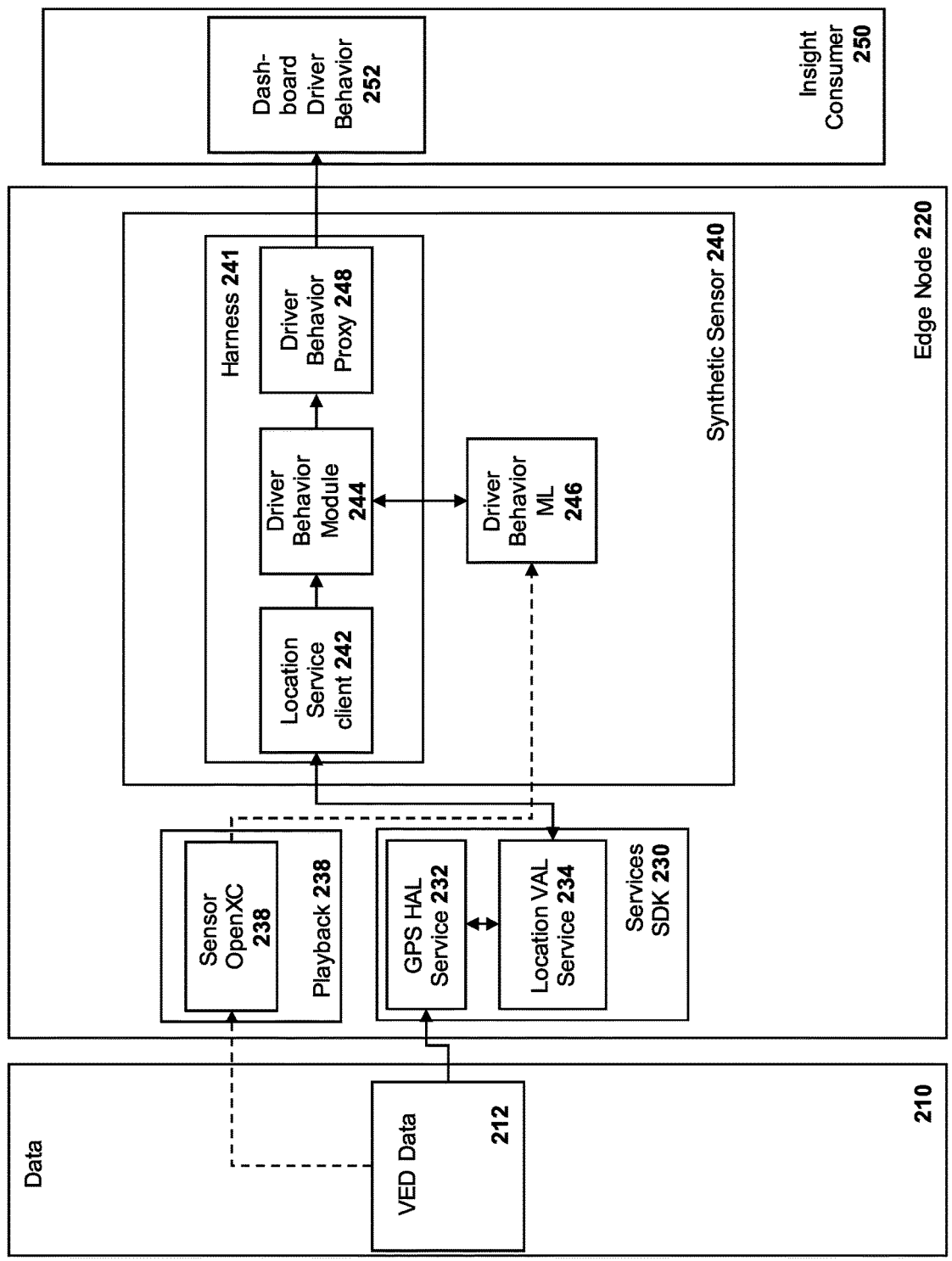
FIG. 2 is a block diagram showing a first, simplified, playback architecture.

Reference is now made to FIG. 2, which shows a simplified architecture diagram for a first playback architecture. In the example of the FIG. 2, a data source 210 could be any computer system or a database in some embodiments. For example, the data source may include data for particular sensors, such as sample video clips stored in a database, sample temperature readings for a simulation of the interior of the vehicle, have a correlation between a sample route traveled and a battery level in an electric vehicle, among others such a data.

In other embodiments, data source 210 could be a real sensor which provides feedback, for example through a communications subsystem, to a computer node running the synthetic sensor. For example, data source 210 may include a camera connected to a real vehicle which is providing feedback to a playback system in other cases, a sensor such as a temperature sensor may be connected for example through a USB or short-range communication port with a computer running the edge node. Other options for a data source 210 are possible.

In the example of FIG. 2, data source 210 includes Vehicle Energy Dataset (VED) data 212, which is a name given for data collected in 2016/2017 from 383 personal cars in Ann Arbor, Michigan VED data 212 is provided to an edge node 220 running the simulation of the synthetic sensor. In particular, edge node 220 includes a services Software Development Kit (SDK) 230 which includes various hardware abstraction layers and vehicle abstraction layers.

In the example of FIG. 2, a Global Positioning System (GPS) HAL service 232 may be provided within services SDK 230. As provided above, HAL services are responsible for the integration of sensors and may provide various functions, including: integration to the underlying sensor; normalization of the sensor data; and/or, if required, providing a barrier between the safety certified and non-certified software. Other functions for the HAL service are also possible. The present is disclosure is not limited to any particular HAL service and the use of the GPS HAL services only provided for illustration purposes.

Therefore, in the embodiment of FIG. 2, the GPS HAL service 232 may translates the VED data to a data type, format, rate, etc., suitable for a particular synthetic sensor. Such data is then provided to a location VAL service 234, which is used for managing access to vehicle data and providing value-added insights.

Specifically, as provided above, insights may leverage sensor data from multiple HALs in order to provide vehicle abstraction and value-added insights. Vehicle insight services in the VAL may control access to a normalized form of vehicle data and provide value-added inferences.

However, in other embodiments, the hardware abstraction layer may not be written for a particular sensor or sensor type. As indicated above, this may lead to significant development delays in order to write the abstraction layers in the particular format, and based on coding rules and requirements for a distributed system.

In this regard, if the abstractions layers do not exist, a playback tool 236 may be used to bypass the abstraction layers. A playback tool, is used here in, could be a lightweight, extensible module that it could be programmed for the particular data source (sensor) and the synthetic sensor utilizing the data. in this way, the playback tool provides a mechanism to easily plug in new sensors and synthetic sensors and to prototype or demonstrate the environment.

In the example of FIG. 2, playback tool 236 includes a sensor module 238 which is illustrated to utilize the OpenXC format. However, the OpenXC format is only provided for illustration purposes, and any formatting of the data source could be utilized for the playback. Sensor module 238 is designed to take input from a particular data source and provide output in a particular format designed for the synthetic sensor. For example, this may include sampling rates, data format types, normalization of sensor data, among other factors. Since the data types, formatting, ranges, and other information from a data file or known sensor is known to a developer for playback module 238, and since the data formatting, rate, normalization, and other information required buy the synthetic sensor is known to the developer, module 238 could easily be created.

Further, module 238 could have variables, transformation algorithms, filters, sampling rate, or other parameters which could be set at runtime. This could be done for performance optimization of synthetic sensor 240 to quickly test the synthetic sensor. As will be appreciated by those in the art, such parameters may ultimately then be used to create the hardware abstraction layer and vehicle abstraction layer for the system for the particular sensor type, and by having such ability for playback, this may improve and speed up the task of creating the abstractions layers.

In the embodiment of FIG. 2, a synthetic sensor 240 is a driver behavior synthetic sensor. This is merely provided for illustration purposes and other types of synthetic sensors could be used with the embodiments of the present disclosure.

A location services client 242 is within a synthetic sensor harness 241. The location services client 242 may query and obtain location data from the location VAL service 234, if one exists. This location data can then be provided to a driver behavior module 244.

Alternatively, if a playback module 238 is used, the data may be inserted directly into the modules within synthetic sensor 240 that need such data, thereby bypassing the hardware abstraction requirements.

The driver behavior module 244 can use a machine learning module 246 to derive insights with regard to driver behavior and provide such insights back to the driver behavior module 244. Based on the driver behavior module 244 compiling such data, a driver behavior proxy 248 may receive the data.

The driver behavior proxy 248 may provide such data to an insight consumer 250. For example, the insight consumer 250 may be a dashboard driver behavior display 252 which may provide a visual display on the driver behavior. In other cases, the insight consumer 250 could be an insurance company that has an agreement with the driver to obtain the driver behavior information. Other options for insight consumers 250 are possible.

In the case of a simulation, the insight consumer 250 may be another program that is connected to the edge node 220 to provide feedback, for example through a visual display, a data stream, among other options, to a user or audience.

Figure 3:
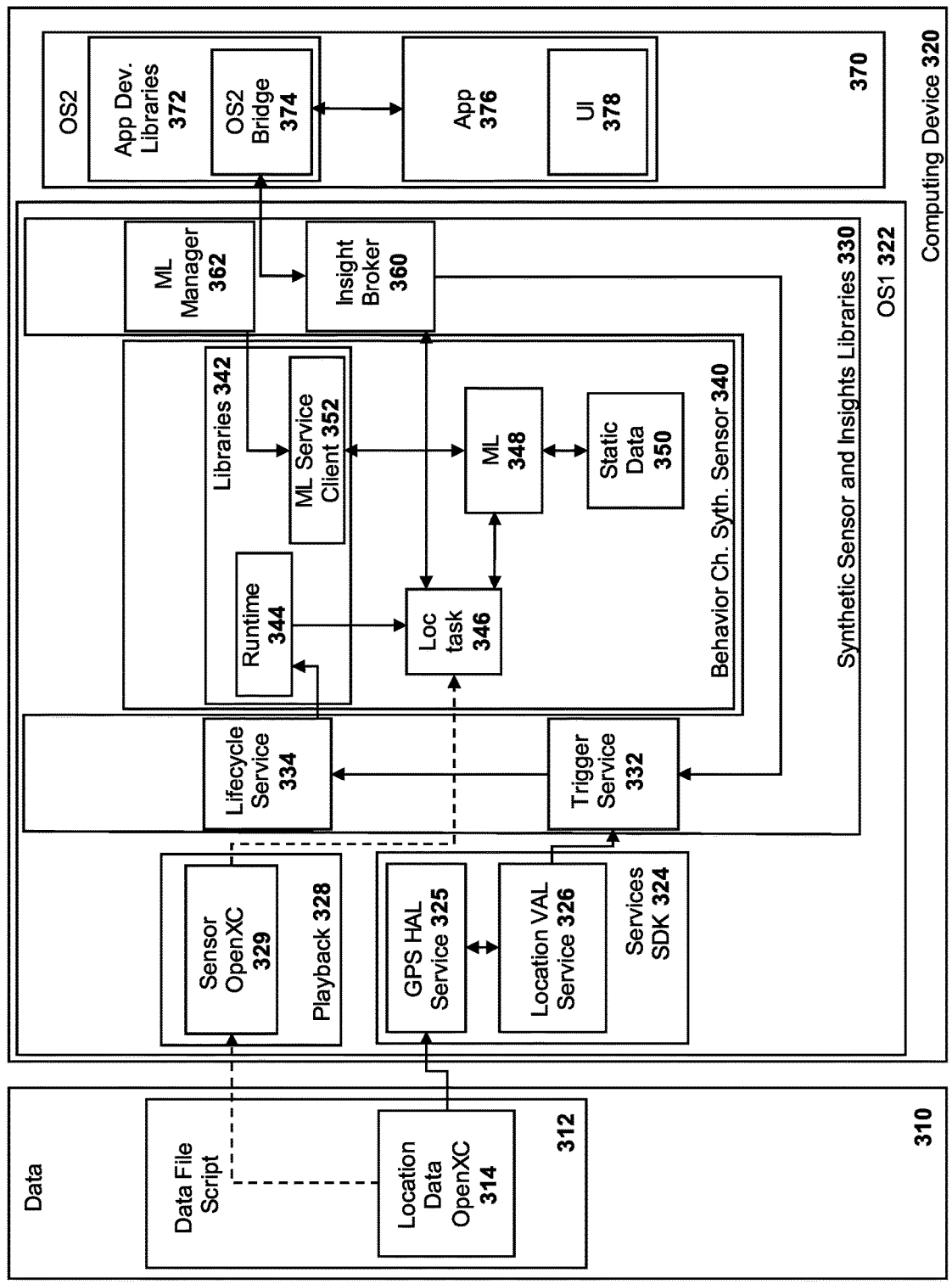
FIG. 3 is a block diagram showing a second, simplified, playback architecture.

In some embodiments, control over the starting and stopping of the various synthetic sensors may be desired. In this case, a trigger service and lifecycle service may be provided within a computing device. Reference is now made to FIG. 3.

In the embodiment of FIG. 3, a data source 310 may be a database or computer file which includes information about one or more sensors that may be provided to a computing device 320. For example, in the embodiment of FIG. 3, a data script file 312 may include a location data OpenXC file 314. As will be appreciated by those in the art, an OpenXC file is an application program interface (API) for automobiles that is a proposed open standard for communications between various hardware elements. Therefore, the simplified example of the FIG. 3 is providing behavior services based on location and the location data is being provided through the openXC file 314.

Data from the OpenXC file 314 may be provided to a Services SDK 324 on computing device 320, and more particularly to a GPS HAL service 325. The services SDK 324 is within a first operating system 322 which is being simulated on computing device 320. For example, the first operating system may be the BlackBerry QNX operating system in some embodiments. however, other operating systems could equally be used.

A Global Positioning System (GPS) HAL service 325 may be provided within services SDK 324. As provided above, HAL services are responsible for the integration of sensors and may provide various functions, including: integration to the underlying sensor; normalization of the sensor data; and/or, if required, providing a barrier between the safety certified and non-certified software. Other functions for the HAL service are also possible. The present is disclosure is not limited to any particular HAL service and the use of the GPS HAL services only provided for illustration purposes.

Therefore, in the embodiment of FIG. 3, the GPS HAL service 325 translates the Location Data OpenXC information to a data type, format, rate, etc., suitable for a particular synthetic sensor. Such data is then provided to a location VAL service 326, which is used for managing access to vehicle data and providing value-added insights.

If the abstractions layers do not exist, a playback tool 328 may be used to bypass the abstraction layers. the playback tool 328, similar to playback tool 238 in the embodiment of FIG. 2, could be a lightweight, extensible module that it could be programmed for the particular data source (sensor) and the synthetic sensor utilizing the data. in this way, the playback tool provides a mechanism to easily plug in new sensors and synthetic sensors and to prototype or demonstrate the environment.

In the example of FIG. 3, playback tool 328 includes a sensor module 329 which is illustrated to utilize the OpenXC format. However, the OpenXC format is only provided for illustration purposes, and any formatting of the data source could be utilized for the playback. Sensor module 329 is designed to take input from a particular data source and provide output in a particular format designed for the synthetic sensor. For example, this may include sampling rates, data format types, normalization of sensor data, among other factors. Since the data types, formatting, ranges, and other information from a data file or known sensor is known to a developer for playback tool 328, and since the data formatting, rate, normalization, and other information required buy the synthetic sensor is known to the developer, playback tool 328 could easily be created.

Further, playback tool 328 could have variables, transformation algorithms, filters, sampling rate, or other parameters which could be set at runtime. This could be done for performance optimization of synthetic sensor 340 to quickly test the synthetic sensor. As will be appreciated by those in the art, such parameters may ultimately then be used to create the hardware abstraction layer and vehicle abstraction layer for the system for the particular sensor type, and by having such ability for playback, this may improve and speed up the task of creating the abstractions layers.

The location VAL service 326, when provided with new information from an abstraction layer in the SDK services 324, may trigger a trigger service 332 within a synthetic sensors and insight library 330. Such trigger service may then cause a lifecycle service 334 to start a runtime on a behavior characteristic synthetic sensor 340. In particular, the synthetic sensor 340 may include libraries 342 and have a runtime library 344 which may be initiated by the lifecycle service 334.

The runtime 344 may includes the location information received from the services SDK and provide such location information to a location at task process or block 346. The location task block 346 may communicate with a machine learning block 348, which may also obtain data from a static data store 350 in order to determine behavior characteristics.

The machine learning module 348 may further communicate with a machine learning service client 352 in order to control the machine learning module 348.

If the hardware abstraction layers for the particular sensor do not exist, playback tool 328 may be used. In this case, the output from sensor module 329 may be inserted directly into the synthetic sensor 340. This is, for example, shown as data being input directly into the location task 346. This avoids the architecture of providing triggering when new data is available and starting a life cycle to run the synthetic sensor. In practice, the synthetic sensor 340 may be set to continually run for the demonstration or prototyping thereby negating the need for the trigger service and lifecycle service for sensors that do not yet have an abstraction layer written for them.

The location task 346 may further feed insights to insight broker 360. Insights are fed into the simulator as an enclosed loop to have coordination of the data from a test perspective. In particular, insights broker 360 may provide a loop back to trigger service 332 to control triggering of the synthetic sensor 340. Insights broker 360 may further communicate with insight consumers, as described below.

Machine learning manager 362 is part of the synthetic sensors and insight libraries 330 and may control the machine learning service client 352.

In the example of FIG. 3, a second operating system 370 may be present on computing device 320. For example, computing device 320 may be simulating an Android operating system for replicating an Android In Vehicle Infotainment (IVI) system. However, other operating systems and applications may equally be simulated.

Operating system 370 includes application development libraries 372 including a bridge 374 which may be used to communicate between the first operating system in the second operating system. In particular, insight broker 360 may communicate with the bridge 374.

Once data is received through bridge 374 on operating system 370, it may be provided to an application 376. As indicated above, one example of an application may be the IVI application on a vehicle. This includes a user interface 378 which may be used to display information based on the insights obtained from the synthetic sensor in the first operating system.

Therefore, the embodiment of FIG. 3 provides a simple, open, scalable, and extensible simulator which can use the modules ordinarily found on a vehicle and simulate operation of those modules utilizing a trigger service, lifecycle service, and insight broker service in order to control the simulation of the data. The data may be in any format, including an open API such as OpenXC format which can then be converted through one or more abstraction layers into data suitable for a synthetic sensor.

Figure 4:
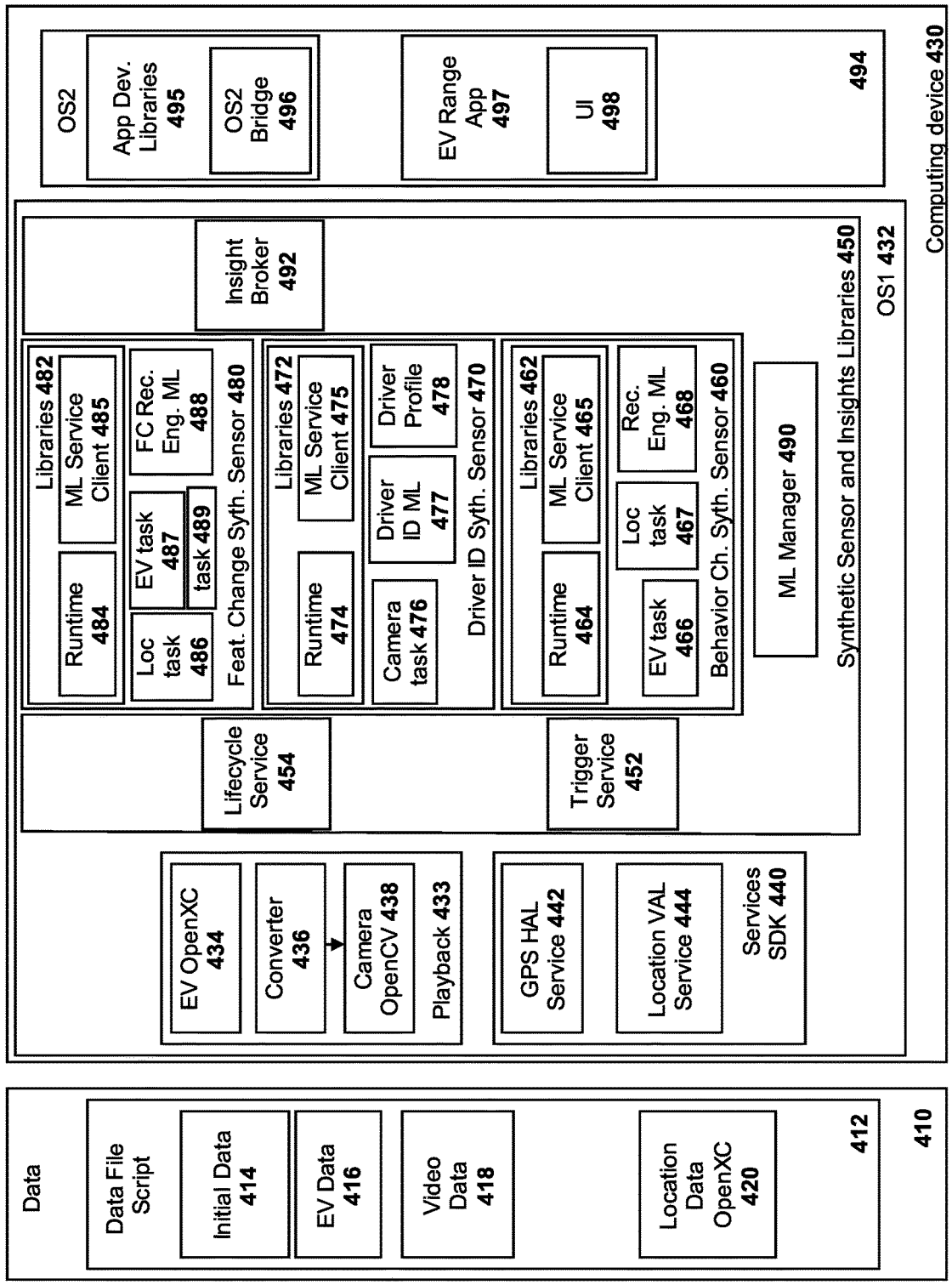
FIG. 4 is a block diagram showing a third, simplified, playback architecture.

A more detailed architecture is shown with regard to FIG. 4. The architecture of FIG. 4 is provided with the example of an electric vehicle (EV) simulation providing range expert output to a user interface. However, this is merely an example and other options for the architecture are possible.

In the example of FIG. 4, a data source 410 may include a plurality of data script files 412. These may include an initial data file 414, which can include various criteria such as a destination location, a USB state, or Wi-Fi state, a screen state, and HVAC state among other options. In one embodiment, the initial data 414 may utilize an OpenXC protocol.

Other data which may exist within the data script file 412 may include electric vehicle data 416. For example, this may include a battery state as a vehicle progresses along a simulated route.

Further data may include video data 418. Such a video data may be used for tasks such as a driver identity verification, as described below.

Further data within the data source 410 may include location data 420, which may, in some embodiments, be in an OpenXC file format. However, other file formats are possible.

In the embodiment of FIG. 4, the data source may be part of, or may be separate, from a computing device 430. Computing device 430 may have a first operating system 432 which may simulate such first operating system. For example, the first operating system may be a BlackBerry QNX operating system in some embodiments. However, other options for first operating system 432 may be possible.

Within first operating system 432, a playback tool 433 may exist. Playback tool 433 may be used to convert to data from sensors which do not have abstraction layers written for such sensor. As will be appreciated by those in the art, the writing of abstraction layers, including the HAL and the VAL, is time-consuming and therefore a playback tool 433 may be used to bypass such abstraction layer creation for prototyping purposes. Specifically, the playback tool 433 provides a lightweight, scalable tool to allow different sensors (whether real or virtual) to be plugged into the computing device 430 without the need to write such abstraction layers, therefore increasing the speed for prototyping and testing synthetic sensors or providing demonstrations to an audience utilizing such synthetic sensors.

In the embodiment of FIG. 4, playback tool 433 has an EV OpenXC module 434 to receive EV data from EV data source 416.

Simulator 433 may further have a converter 436, for example to convert video data 418. Converter 436 therefore may, for example, convert one file format to a second file format, such as MP4 to JPEG, among other options. In some embodiments, rather than conversion into a particular data format, converter 436 may convert the file into a mathematical matrix, for example to input directly to a machine learning or artificial intelligence module in a synthetic sensor.

The output from the converter may be provided to a camera OpenCV module 438 which may use the OpenCV protocol to provide outputs.

Further, in some embodiments, a services SDK 440 with various abstraction layers may also exist within computing device 430. In the embodiment of FIG. 4, the services SDK 440 includes a GPS hardware abstraction layer service 442, as well as a location vehicle abstraction layer service 444.

The embodiment of FIG. 4 further includes synthetic sensors and insights library 450 which may include a trigger service 452 as well as a lifecycle service 454. Trigger service 452 may be used to trigger the starting or stopping of a synthetic sensor. It may further be used as a trigger for the starting of the vehicle or may trigger based on input from an insight broker, among other options. The lifecycle service 454 may be used to start and stop the sensors through the lifecycle of the playback.

In the embodiment of FIG. 4, three synthetic sensors are provided. Specifically, a behavior change synthetic sensor 460 is provided and may be used to provide behavior change recommendations, for example when an electric vehicle is within a threshold proximity of the range needed to complete a trip.

Further, a driver identifier synthetic sensor 470 is provided which may be used to identify the driver and therefore configure the vehicle based on the driver profile.

A feature change synthetic sensor 480 may be used to recommend to a driver various feature changes which may extend the battery life when range predictions compared with route requirements are below a threshold, for example.

Behavior change synthetic sensor 460 may have its own sensor and insight libraries 462, which may include a synthetic sensor runtime module 464, as well as a machine learning service client 465.

Further, the behavior change synthetic sensor 460 may have a plurality of blocks or processes which may be used to generate the insights. For example, the behavior change synthetic sensor 460 may have an EV task block 466 which may monitor the EV task. The synthetic sensor may also have a location task 467 which may monitor the location of the vehicle compared with a destination. A behavior change recommendation engine machine learning module 468 may compare the EV task for him from EV task block 466 with the location task from location task block 467 and, depending on the projected range and destination distance, may provide behavior recommendations for the driving of the vehicle.

The driver identity synthetic sensor 470 includes behavior and insights libraries 472 which may include a synthetic sensor runtime 474 as well as a machine learning services client 475.

In this case, the synthetic sensor may include a camera task 476 to process camera input. Further, a driver identity machine learning module 477 may use input from the camera task to identify a driver based on input from a driver profile database 478. Driver profile database 478 may include driver profile preferences for a plurality of drivers in some cases.

The feature change synthetic sensor 480 may be used to recommend feature changes. In this case, the feature change synthetic sensor 480 includes sensor and insights libraries 482 which have a synthetic sensor runtime module 484. Further, the libraries may include machine learning service client 485.

The synthetic sensor may have a location task module 486 to monitor the location of the vehicle. Further, the sensor may have an EV task module 487 to monitor the battery of the vehicle.

Further, a task module 489 may be used for providing a list of tasks being used by the vehicle.

A feature change recommendation engine machine learning module 488 may receive input from the various task modules and provide feature change recommendations.

A machine learning manager 490 may manage the various machine learning service clients 465, 475 and 485.

An insight broker 492 may be provide with closed loop to have coordination of the data and can be used for a test perspective.

In the embodiment of FIG. 4, a second operating system may be utilized. For example, the second operating system may be the android operating system operating and in vehicle infotainment system. However, other options for both the operating system and the applications are possible. In particular, operating system 494 includes an application development library 495 with a bridge 496 to provide for interaction between the first operating system and the second operating system.

An electric vehicle range application 497 is shown as an example application and may include a user interface component 498 to provide output, whether visual, haptic, or audio, to a vehicle user.

In operation, the initial data 414 may be provided directly to the synthetic sensors to set states within the synthetic sensors. Therefore, location data, destination data, HVAC states, screen states, Wi-Fi states may be provided to the feature change recommendation engine machine learning module 488 as well as the behavior change recommendation engine 468.

Subsequently, the playback may start, and EV data may be provided from the EV data source 416 to the EV OpenXC simulator module 434. Thereafter, the EV task 466 and EV task 487 may query the EV OpenXC module 434 to find the EV state. As will be appreciated, this bypasses the trigger service 452 and lifecycle service 454 and therefore allows for rapid development, prototyping, and demonstration.

Video data 418 may be provided through converter 434 to the camera OpenCV module 438. Thereafter, a camera task module 476 may interact with that the simulator module to obtain camera data. Again, this bypasses the trigger service 452 and lifecycle service 454.

Similarly, location data from location data source 420 may be provided through the GPS HAL service 442 and location VAL service 444 and output from the location VAL service may be provided to the trigger service 452. This can trigger that the vehicle is moving and cause the trigger service 452 to start the lifecycle service 454.

The lifecycle service 454 may provide input to the runtime modules 464, 474, and 484 to indicate to the synthetic sensors that the synthetic sensors should start operating.

As described above, within each synthetic sensor, various task modules may be used by a machine learning module to provide insights. Thus, in the driving scenario, a behavior change synthetic sensor 460 may provide insights from the recommendation engine machine learning module 468 to indicate that driver behavior should change or that the vehicle should be recharged prior to reaching a destination if the electric vehicle does not have the range to reach the destination. Similarly, a driver identifier machine learning module 477 may utilize camera data to capture an image of the driver of the vehicle then process the image to identify the driver and therefore utilize the driver profile and preferences. For example, the driver profile and preferences may indicate how the driver normally drives, and this may affect the range of the vehicle.

The feature change synthetic sensor may review with the features that are active in the vehicle, such as whether the HVAC system is on, whether seat warmers are on, whether the windows of the vehicle are open or closed, among other options, and may provide recommendations to enable or disable features to increase or improve the range of the vehicle.

The insights from each of the synthetic sensors may be provided to an insight broker 492 which may then interact using the bridge 496 with the range application 497 and in particular the user interface 498. Thus, for example, if the range is within a predetermined threshold, then the UI may not display any recommendations. However, if the range compared with the destination is within a certain range, then various options may be provided to the users, such as recommended driving behavior, feature enablement or disablement, or optional stops for charging the vehicle, among other options.

The insight broker 492 may further provide input back to the trigger service 452 to thereby create a loop for the playback. For example, if a changing driver is detected, this may trigger the lifecycle service to enable the feature change synthetic sensor and the behavior change synthetic sensor to re-evaluate the insights from such synthetic sensors.

While the embodiment of FIG. 4 shows a range application on a user interface and a plurality of synthetic sensors used to provide recommendations on such range application, this is merely provided for illustration purposes. In other embodiments, other tasks can use different synthetic sensors and different data inputs using different sensors, whether real or simulated.

Prototyping

As indicated above, the embodiments of FIG. 2, 3 or 4 could be used for rapid prototyping of synthetic sensors. Therefore, a developer of a synthetic Sensor could easily plug such synthetic sensor into a computing device such computing device 430. A data source could be created from real world sensors or from simulated sensors. A playback tool 433 could be created to allow the use of sensor data for synthetic sensors in a lightweight and scalable manner.

Specifically, the developer could utilize abstraction layers by either creating the abstraction layers or by using existing abstraction layers in some embodiments. However, in other cases, a playback tool such as playback tool 433 could be used for data conversion from a particular sensor into a format that the synthetic sensor is expecting. In this case, the developer merely needs to create a module such as EV OpenXC module 434, which can be used for a particular type of data and could therefore be a lightweight add-on to the simulator 434 for rapidly providing data to a synthetic sensor.

Initial states for testing the synthetic sensor could be set using initial data 414. The initial states could include vehicle settings but can also include vehicle environment in some embodiments. For example, if the vehicle was driving on a racetrack versus a city street versus a highway, this may affect the performance and be set within the initial data 414.

In one embodiment, the playback tool could be initialized or triggered by the developer to start the data flow and the lifecycle services could be used to regulate the lifecycle of the simulation. In some embodiments, a pause condition may exist within the playback tool to allow the playback to be paused. This may, for example, be used for debugging in some situations. In some cases, the stop condition may completely end the playback at the playback tool before all the data has been run.

In still further cases, a start condition may allow the playback to be started at a point in the data stream.

In some embodiments come over parameters within the playback tool could be easily adjusted come on for example by using easily accessible variables, user interfaces or other such means to change the parameters and thereby optimize the performance of the various synthetic sensors for which prototyping is occurring.

In other embodiments, the prototyping may be for the application or user interface on the vehicle rather than, or in addition to, a synthetic sensor. In this case, the use of the various sensors could again be rapidly adapted to provide data to various synthetic sensors utilizing a playback tool 433. In this case, the output or user interface 498 may be monitored and the simulation may be started or stopped utilizing the pause feature within a playback tool.

Demonstration

In a further case, the embodiments of FIGS. 2 to 4 may be utilized for providing audience presentations. Specifically, in order to demonstrate the features of a vehicle system to clients, stakeholders, developers or others, demonstrations may need to be provided for the use of such system. For example, a playback may be provided for a road trip in which a particular driver gets into the vehicle, is identified, range values based on driver behavior and past driving history may be created, taking into account the features that are enabled within the vehicle, and the output of the range application user interface 498 may be shown to the audience. This may include the identification of the driver and how it affects the range being output.

Snags such as traffic, low-temperature, or other factors which may affect the range of the vehicle may be introduced within the data script files and this could then lead to changes and recommendations for behaviours or recommendations for enabling or disabling features, which may be shown on the UI to the audience for the presentation.

A pausing or stopping feature may allow for the presenter to pause or stop, for example by stopping the dataflow through the use of a script within the playback tool, in order for the presenter to make a point, answer questions, among other options.

The embodiments of FIGS. 2 to 4 therefore provide for a playback of sensor data within a computing system for development and testing of synthetic sensors. For safety reasons, the playback is done on a computing device rather than on the vehicle itself. The playback can be started and stopped. The playback can further handle real world data through a data source.

Multiple formats for playback, such as an OpenXC simulator, an OpenCV simulator, direct data, among other options can be presented in the embodiments of FIGS. 2 to 4.

In some embodiments, the playback tool can be on a real-world vehicle and used as a data converter if an abstraction layer for a particular sensor has not yet been written.

The playback tool may, in some embodiments, be extended to take into account the environment that the vehicle is in, such as a racetrack versus a road among other options.

Figure 5:
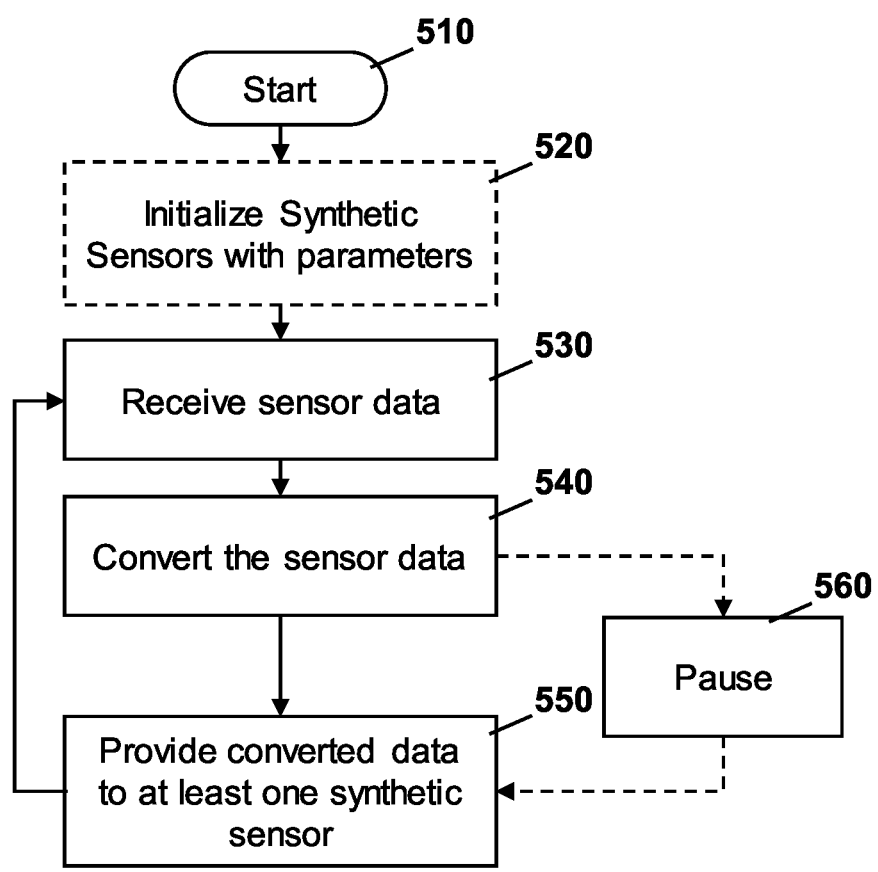
FIG. 5 is a process diagram showing the use of a playback tool at a computing device.

One example method for the computing device is shown with regard to FIG. 5. In particular, the process of FIG. 5 starts at block 510 and proceeds to block 520 in which the computing device may optionally initialize synthetic sensors with various initialization parameters. Initialization parameters, for example, may define initial settings for various features on the computing device.

From block 520 the process proceeds to block 530 in which the computing device may receive sensor data. In particular, the reception of the sensor data may be from a different computer through a communication subsystem on the computing device, from a database within the computing device itself, from sensors that are either wired or connected wirelessly to the computing device, among other options.

From block 530, the process proceeds to block 540 in which the playback tool may convert the sensor data. For example, the conversion may be to tailor the sampling rate of the data to the expected sampling rate for the synthetic sensor. In other embodiments, the conversion may include changing the data format of the sensor data into a data format expected by the synthetic sensor. In other embodiments, the conversion may include changing the data type. For example, an image file may be converted to a mathematical matrix. In other embodiments, the conversion of the sensor data may include normalizing the sensor data to a level expected by the synthetic sensor. In other embodiments, the conversion may include one or more of the above.

From block 540, once the sensor data is converted into a converted data format, the converted data is then provided to at least one synthetic sensor on the computing device at block 550.

The process may then proceed from block 550 back to block 530 to continue to receive sensor data until the playback is finished.

Optionally, a pause function 560 may exist in which the converted data is not provided to the synthetic sensor until a user resumes the dataflow. Further, other functions such as a starting function to resume playback or start playback from a midpoint in the route may exist. In some cases, a stopping function can be used to stop the playback before all the data has been played back. Other options for functions using the playback tool are further possible.

In optional embodiments, once this synthetic sensor is provided with converted data, it may provide an output which is then used to provide an output to a display of the computing device.

The above computing devices, platforms, electronic control units, nodes or other computing systems may be implemented using any computing device. One simplified diagram of a computing device is shown with regard to FIG. 6. The computing device of FIG. 6 could be any fixed or mobile computing device.

Figure 6:
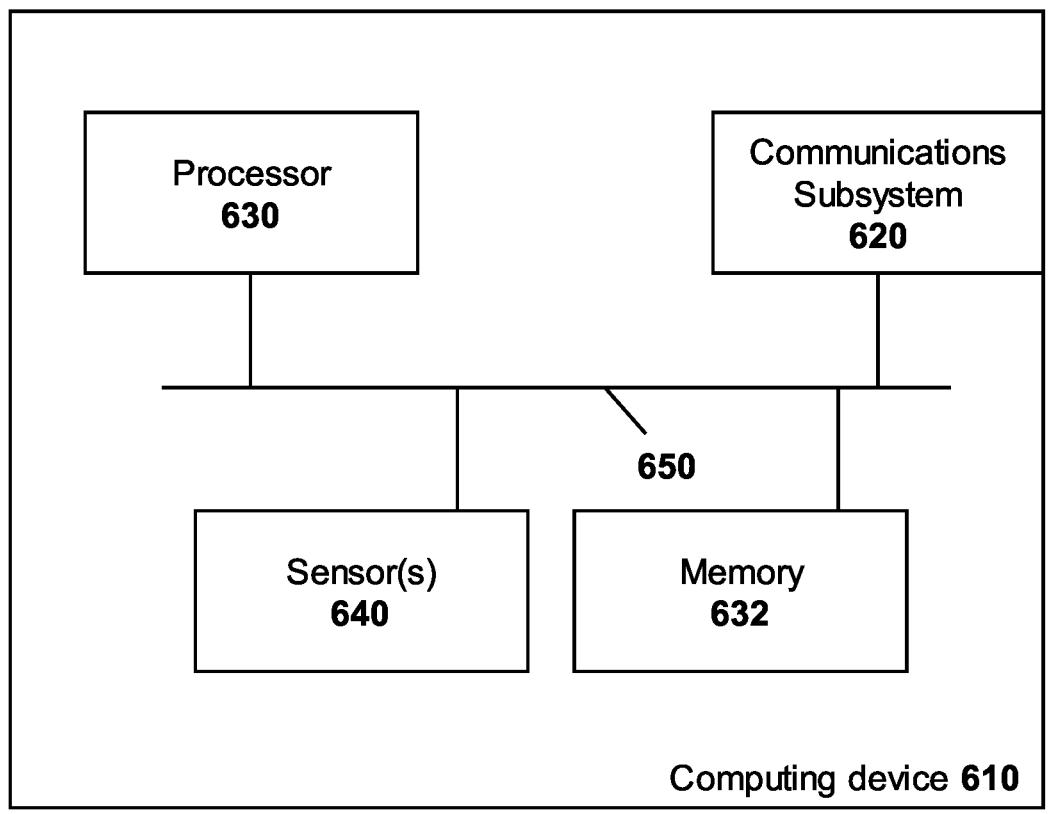
FIG. 6 is a block diagram of a simplified computing device capable of being used with the embodiments of the present disclosure.

In FIG. 6, device 610 includes a processor 620 and a communications subsystem 630, where the processor 620 and communications subsystem 630 cooperate to perform the methods of the embodiments described above. Communications subsystem 630 allows device 610 to communicate with other devices or network elements and may vary based on the type of communication being performed. Further, communications subsystem 630 may comprise a plurality of communications technologies, including any wired or wireless communications technology.

Processor 620 is configured to execute programmable logic, which may be stored, along with data, on device 610, and shown in the example of FIG. 6 as memory 632. Memory 632 can be any tangible, non-transitory computer readable storage medium which stores instruction code that, when executed by processor 620 cause device 610 to perform the methods of the present disclosure. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 632, device 610 may access data or programmable logic from an external storage medium, for example through communications subsystem 630.

In the example of FIG. 6, one or more sensors 640 may be associated with the computing device. However, this is optional and, in some cases, computing device 610 will not be associated with sensors.

Communications between the various elements of device 610 may be through an internal bus 660 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems, or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device comprising:
   receiving, at the computing device, sensor data from a data source, wherein the data source is one of a data repository or a sensor;
   in response to an absence of abstraction lavers at the computing device, converting, at a playback tool on the computing device, the sensor data into converted data;
   receiving a first user input to start the providing of the converted data to at least one synthetic sensor on the computing device;
   responsive to the first user input, providing the converted data to the at least one synthetic sensor on the computing device,
   receiving a user input to pause or stop the providing the converted data during provision of the converted data;
   pausing, or stopping the providing the converted data by invoking at least one of a pause routine or a stop routine at the playback tool, upon receiving the user input;
   wherein each of the at least one synthetic sensor provides an insight regarding operation of the computing device.

2. The method of claim 1, wherein the providing the converted data comprises bypassing trigger modules and lifecycle modules for the at least one synthetic sensor at the computing device.

3. The method of claim 1, wherein the converting utilizes a module configured for the received sensor data and further configured for the at least one synthetic sensor.

4. The method of claim 3, wherein the module includes variables to dynamically tune the converting.

5. The method of claim 3, wherein the module performs at least one of: setting a data sampling rate; converting a data format of the sensor data; converting a data type of the sensor data; and normalizing the sensor data.

6. The method of claim 1, further comprising:
   receiving initialization data at the computing device prior to receiving the sensor data; and
   initializing the at least one synthetic sensor based on the initialization data.

7. The method of claim 1, further comprising utilizing the insight to update a display associated with the computing device.

8. The method of claim 1, wherein the sensor data represents data from one or more vehicle sensors, and wherein the computing device virtualizes at least one operating system from a vehicle computing system.

9. A computing device comprising:
   a processor; and
   a communications subsystem, wherein the computing device is configured to:
  receive sensor data from a data source, wherein the data source is one of a data repository or a sensor;
  in response to an absence of abstraction layers at the computing device, convert, at a playback tool on the computing device, the sensor data into converted data;
  receive a first user input to start the providing of the converted data to at least one synthetic sensor on the computing device;
  responsive to the first user input, provide the converted data to the at least one synthetic sensor on the computing device, and
  receive a user input to pause or stop the providing the converted data during provision of the converted data;
  pause, or stop the providing the converted data by invoking at least one of a pause routine or a stop routine at the playback tool, upon receiving the user input;
  wherein each of the at least one synthetic sensor provides an insight regarding operation of the computing device.

10. The computing device of claim 9, wherein computing device is configured to provide the converted data by bypassing trigger modules and lifecycle modules for the at least one synthetic sensor at the computing device.

11. The computing device of claim 9, wherein the computing device is configured to convert using a module configured for the received sensor data and further configured for the at least one synthetic sensor.

12. The computing device of claim 11, wherein the module includes variables to dynamically tune the converting.

13. The computing device of claim 11, wherein the module performs at least one of: setting a data sampling rate; converting a data format of the sensor data; converting a data type of the sensor data; and normalizing the sensor data.

14. The computing device of claim 9, wherein the computing device is further configured to:
  receive initialization data at the computing device prior to receiving the sensor data; and initialize the at least one synthetic sensor based on the initialization data.

15. The computing device of claim 9, wherein the computing device is further configured to utilize the insight to update a display associated with the computing device.

16. The computing device of claim 9, wherein the sensor data represents data from one or more vehicle sensors, and wherein the computing device virtualizes at least one operating system from a vehicle computing system.

17. A non-transitory computer readable medium for storing instruction code which, when executed by a processor of a computing device cause the computing device to:
  receive sensor data from a data source, wherein the data source is one of a data repository or a sensor;
  in response to an absence of abstraction layers at the computing device, convert, at a playback tool on the computing device, the sensor data into converted data;
  receive a first user input to start the providing of the converted data to at least one synthetic sensor on the computing device;
  responsive to the first user input, provide the converted data to the at least one synthetic sensor on the computing device, and
  receive a user input to pause or stop the providing the converted data during provision of the converted data; and
  pause, or stop the providing the converted data by invoking at least one of a pause routine or a stop routine at the playback tool, upon receiving the user input;
  wherein each of the at least one synthetic sensor provides an insight regarding operation of the computing device.

18. The computer readable medium of claim 17, wherein the instruction code is further configured to cause the computing device to provide the converted data by bypassing trigger modules and lifecycle modules for the at least one synthetic sensor at the computing device.

* * * * *